US012314752B2

(12) United States Patent
Mullen et al.

(10) Patent No.: US 12,314,752 B2
(45) Date of Patent: *May 27, 2025

(54) EXECUTION OF AUXILIARY FUNCTIONS IN AN ON-DEMAND NETWORK CODE EXECUTION SYSTEM

(71) Applicant: Amazon Technologies, Inc., Seattle, WA (US)

(72) Inventors: Niall Mullen, Seattle, WA (US); Philip Piwonka, Seattle, WA (US); Timothy Allen Wagner, Seattle, WA (US); Marc Brooker, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/412,105

(22) Filed: Jan. 12, 2024

(65) Prior Publication Data
US 2024/0220305 A1    Jul. 4, 2024

Related U.S. Application Data

(63) Continuation of application No. 17/107,663, filed on Nov. 30, 2020, now Pat. No. 11,875,173, which is a (Continued)

(51) Int. Cl.
*G06F 9/455* (2018.01)
*G06F 9/48* (2006.01)
*G06F 9/50* (2006.01)

(52) U.S. Cl.
CPC ......... *G06F 9/45558* (2013.01); *G06F 9/455* (2013.01); *G06F 9/45533* (2013.01);
(Continued)

(58) Field of Classification Search
CPC .... G06F 9/455; G06F 9/45533; G06F 9/4558; G06F 2009/45562; G06F 2009/4557;
(Continued)

(56) References Cited

U.S. PATENT DOCUMENTS 4,949,254 A    8/1990  Shorter
5,283,888 A    2/1994  Dao et al.
(Continued)

FOREIGN PATENT DOCUMENTS

CA    2962633 C     4/2012
CA    2975522 A1    8/2016
(Continued)

OTHER PUBLICATIONS

Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UseGuide/ec2-ug.pdf (retrieved on Jul. 27, 2022] 795 pages.
(Continued)

*Primary Examiner* — Charles M Swift
(74) *Attorney, Agent, or Firm* — Knobbe, Martens, Olson & Bear, LLP

(57) ABSTRACT

Systems and methods are described for providing auxiliary functions in an on-demand code execution system in a manner that enables efficient execution of code. A user may generate a task on the system by submitting code. The system may determine the auxiliary functions that the submitted code may require when executed on the system, and may provide these auxiliary functions by provisioning or configuring sidecar virtualized execution environments that work in conjunction with the main virtualized execution environment executing the submitted code. Sidecar virtual-
(Continued)

ized execution environments may be identified and obtained from a library of preconfigured sidecar virtualized execution environments, or a sidecar agent that provides the auxiliary function may be identified from a library, and then a virtualized execution environment may be provisioned with the agent and/or configured to work in conjunction with the main virtualized execution environment.

20 Claims, 8 Drawing Sheets

Related U.S. Application Data continuation of application No. 16/017,954, filed on Jun. 25, 2018, now Pat. No. 10,853,115.

(52) U.S. Cl.
CPC .............. *G06F 9/48* (2013.01); *G06F 9/4806* (2013.01); *G06F 9/4881* (2013.01); *G06F 9/50* (2013.01); *G06F 9/5005* (2013.01); *G06F 9/5027* (2013.01); *G06F 9/5038* (2013.01); *G06F 2009/45562* (2013.01); *G06F 2009/4557* (2013.01); *G06F 2009/45575* (2013.01); *G06F 2009/45591* (2013.01); *G06F 2009/45595* (2013.01)

(58) Field of Classification Search
CPC .............. G06F 2009/45575; G06F 9/48; G06F 9/4806; G06F 9/4843; G06F 9/4881; G06F 9/50; G06F 9/5005; G06F 9/5027; G06F 9/5038
See application file for complete search history.

(56) References Cited

U.S. PATENT DOCUMENTS

| | | | |
|---|---|---|---|
| 5,835,764 A | 11/1998 | Platt et al. |
| 5,970,488 A | 10/1999 | Crowe et al. |
| 5,983,197 A | 11/1999 | Enta |
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,360,215 B2 | 4/2008 | Kraiss et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,640,574 B1 | 12/2009 | Kim et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,402,514 B1 | 3/2013 | Thompson et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,713,093 B1 | 4/2014 | Upadhyay et al. |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,763,091 B1 | 6/2014 | Singh et al. |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,266 B1 | 8/2014 | Qu et al. |
| 8,806,468 B2 | 8/2014 | Meijer et al. |
| 8,806,644 B1 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,949,457 B1 | 2/2015 | Theroux et al. |
| 8,966,495 B2 | 2/2015 | Kulkarni |
| 8,972,980 B2 | 3/2015 | Banga et al. |
| 8,990,807 B2 | 3/2015 | Wu et al. |
| 8,997,093 B2 | 3/2015 | Dimitrov |
| 9,002,871 B2 | 4/2015 | Bulkowski et al. |
| 9,021,501 B2 | 4/2015 | Li et al. |
| 9,026,658 B2 | 5/2015 | Xu et al. |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,104,477 B2 | 8/2015 | Kodialam et al. |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,130,900 B2 | 9/2015 | Tran |
| 9,141,410 B2 | 9/2015 | Leafe et al. |
| 9,146,764 B1 | 9/2015 | Wagner |

(56) References Cited

U.S. PATENT DOCUMENTS

| | | |
|---|---|---|
| 9,152,406 B2 | 10/2015 | De et al. |
| 9,154,955 B1 | 10/2015 | Bertz et al. |
| 9,164,754 B1 | 10/2015 | Pohlack |
| 9,176,871 B1 | 11/2015 | Serlet |
| 9,183,019 B2 | 11/2015 | Kruglick |
| 9,189,778 B1 | 11/2015 | Sh. Al-Rashidi |
| 9,195,520 B2 | 11/2015 | Turk |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,565,190 B1 | 2/2017 | Telvik et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,799,017 B1 | 10/2017 | Vermeulen et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,496,547 B1 | 12/2019 | Naenko et al. |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,567,492 B1 | 2/2020 | Natarajan |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 | 5/2020 | Wozniak |
| 10,678,522 B1 | 6/2020 | Yerramreddy et al. |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,732,951 B2 | 8/2020 | Jayanthi et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |

(56) References Cited

U.S. PATENT DOCUMENTS

| | | |
|---|---|---|
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 10,956,244 B1 | 3/2021 | Cho |
| 11,010,188 B1 | 5/2021 | Brooker et al. |
| 11,016,815 B2 | 5/2021 | Wisniewski et al. |
| 11,044,198 B1 | 6/2021 | Ahn et al. |
| 11,082,333 B1 | 8/2021 | Lam et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,327,992 B1 | 5/2022 | Batsakis et al. |
| 11,354,169 B2 | 6/2022 | Marriner et al. |
| 11,360,793 B2 | 6/2022 | Wagner et al. |
| 11,392,497 B1 | 7/2022 | Brooker et al. |
| 11,461,124 B2 | 10/2022 | Wagner et al. |
| 11,467,890 B2 | 10/2022 | Wagner |
| 11,550,713 B1 | 1/2023 | Piwonka et al. |
| 11,561,811 B2 | 1/2023 | Wagner |
| 11,593,270 B1 | 2/2023 | Brooker et al. |
| 11,714,675 B2 | 8/2023 | Brooker et al. |
| 11,836,516 B2 | 12/2023 | Brooker et al. |
| 11,861,386 B1 | 1/2024 | Varun Mukesh et al. |
| 11,875,173 B2 | 1/2024 | Mullen et al. |
| 11,943,093 B1 | 3/2024 | Brooker et al. |
| 11,968,280 B1 | 4/2024 | Sood et al. |
| 12,015,603 B2 | 6/2024 | Danilov et al. |
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0126200 A1 | 7/2003 | Wolff |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1 | 2/2006 | Chu et al. |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0282330 A1 | 12/2006 | Frank et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1 | 1/2009 | Grey et al. |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |

(56) References Cited

U.S. PATENT DOCUMENTS

| | | |
|---|---|---|
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058294 A1 | 3/2010 | Best et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0169477 A1 | 7/2010 | Stienhans et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1 | 5/2012 | Chung et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324052 A1 | 12/2012 | Paleja et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132283 A1 | 5/2013 | Hayhow et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0181998 A1 | 7/2013 | Malakapalli et al. |

(56) References Cited

U.S. PATENT DOCUMENTS

| | | |
|---|---|---|
| 2013/0185719 A1 | 7/2013 | Kar et al. |
| 2013/0185729 A1 | 7/2013 | Vasic et al. |
| 2013/0191847 A1 | 7/2013 | Sirota et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault et al. |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1 | 9/2014 | Cheriton |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0025989 A1 | 1/2015 | Dunstan |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0206139 A1 | 7/2015 | Lea |
| 2015/0212818 A1 | 7/2015 | Gschwind et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |

(56) References Cited

U.S. PATENT DOCUMENTS

| | | |
|---|---|---|
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1 | 9/2015 | Saladi et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0072781 A1 | 3/2016 | Zhang et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |
| 2016/0224785 A1 | 8/2016 | Wagner et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0350124 A1 | 12/2016 | Gschwind et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060610 A1 | 3/2017 | Klee et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0118247 A1 | 4/2017 | Hussain et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1 | 6/2017 | Doerner et al. |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1 | 7/2017 | Biberman et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286143 A1 | 10/2017 | Wagner et al. |
| 2017/0286187 A1 | 10/2017 | Chen et al. |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0322824 A1 | 11/2017 | Reuther et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0371724 A1 | 12/2017 | Wagner et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0113793 A1 | 4/2018 | Fink et al. |
| 2018/0121245 A1 | 5/2018 | Wagner et al. |
| 2018/0121665 A1 | 5/2018 | Anderson et al. |
| 2018/0129684 A1 | 5/2018 | Wilson et al. |
| 2018/0143865 A1 | 5/2018 | Wagner et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |

(56) References Cited

U.S. PATENT DOCUMENTS

| | | |
|---|---|---|
| 2018/0165110 A1 | 6/2018 | Hta |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0367517 A1 | 12/2018 | Tus |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson, II et al. |
| 2019/0034095 A1 | 1/2019 | Singh et al. |
| 2019/0043231 A1 | 2/2019 | Uzgin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102278 A1 | 4/2019 | Gahlin et al. |
| 2019/0108058 A1 | 4/2019 | Wagner et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0147515 A1 | 5/2019 | Hurley et al. |
| 2019/0149480 A1 | 5/2019 | Singvhi |
| 2019/0155629 A1 | 5/2019 | Wagner et al. |
| 2019/0171423 A1 | 6/2019 | Mishra et al. |
| 2019/0171470 A1 | 6/2019 | Wagner |
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0227849 A1 | 7/2019 | Wisniewski et al. |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0268152 A1 | 8/2019 | Sandoval et al. |
| 2019/0278938 A1 | 9/2019 | Greene et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0311115 A1 | 10/2019 | Lavi et al. |
| 2019/0318312 A1 | 10/2019 | Foskett et al. |
| 2019/0320038 A1 | 10/2019 | Walsh et al. |
| 2019/0324813 A1 | 10/2019 | Bogineni et al. |
| 2019/0339955 A1 | 11/2019 | Kuo et al. |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2019/0384647 A1 | 12/2019 | Reque et al. |
| 2019/0391834 A1 | 12/2019 | Mullen et al. |
| 2019/0391841 A1 | 12/2019 | Mullen et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0034471 A1 | 1/2020 | Danilov et al. |
| 2020/0057680 A1 | 2/2020 | Marriner et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0104198 A1 | 4/2020 | Hussels et al. |
| 2020/0104378 A1 | 4/2020 | Wagner et al. |
| 2020/0110691 A1 | 4/2020 | Bryant et al. |
| 2020/0120120 A1 | 4/2020 | Cybulski |
| 2020/0134030 A1 | 4/2020 | Natanzon et al. |
| 2020/0136933 A1 | 4/2020 | Raskar |
| 2020/0142724 A1 | 5/2020 | Wagner et al. |
| 2020/0153798 A1 | 5/2020 | Liebherr |
| 2020/0153897 A1 | 5/2020 | Mestery et al. |
| 2020/0167208 A1 | 5/2020 | Floes et al. |
| 2020/0186445 A1 | 6/2020 | Govindaraju et al. |
| 2020/0192646 A1 | 6/2020 | Yerramreddy et al. |
| 2020/0192707 A1 | 6/2020 | Brooker et al. |
| 2020/0213151 A1 | 7/2020 | Srivatsan et al. |
| 2020/0241930 A1 | 7/2020 | Garg et al. |
| 2020/0327236 A1 | 10/2020 | Pratt et al. |
| 2020/0341799 A1 | 10/2020 | Wagner et al. |
| 2020/0348979 A1 | 11/2020 | Calmon |
| 2020/0349067 A1 | 11/2020 | Syamala et al. |
| 2020/0366587 A1 | 11/2020 | White et al. |
| 2020/0401455 A1 | 12/2020 | Church et al. |
| 2021/0019056 A1 | 1/2021 | Mangione-Tran |
| 2021/0081233 A1 | 3/2021 | Mullen et al. |
| 2021/0117534 A1 | 4/2021 | Maximov et al. |
| 2021/0124822 A1 | 4/2021 | Tiwary et al. |
| 2021/0176333 A1 | 6/2021 | Coleman et al. |
| 2021/0232415 A1 | 7/2021 | Wagner et al. |
| 2021/0294646 A1 | 9/2021 | Hassaan et al. |
| 2021/0389963 A1 | 12/2021 | Wagner |
| 2022/0004423 A1 | 1/2022 | Brooker et al. |
| 2022/0012083 A1 | 1/2022 | Brooker et al. |
| 2022/0214863 A1 | 7/2022 | Clement et al. |
| 2022/0391238 A1 | 12/2022 | Wagner |
| 2023/0024699 A1 | 1/2023 | Bayoumi et al. |

FOREIGN PATENT DOCUMENTS

| | | |
|---|---|---|
| CN | 1341238 A | 3/2002 |
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 101764824 A | 6/2010 |
| CN | 102171712 A | 8/2011 |
| CN | 102246152 A | 11/2011 |
| CN | 102365858 A | 2/2012 |
| CN | 102420846 A | 4/2012 |
| CN | 102761549 A | 10/2012 |
| CN | 103098027 A | 5/2013 |
| CN | 103140828 A | 6/2013 |
| CN | 103384237 A | 11/2013 |
| CN | 103731427 A | 4/2014 |
| CN | 104111848 A | 10/2014 |
| CN | 104160378 A | 11/2014 |
| CN | 104243479 A | 12/2014 |
| CN | 104903854 A | 9/2015 |
| CN | 105122243 A | 12/2015 |
| CN | 105956000 A | 9/2016 |
| CN | 106921651 A | 7/2017 |
| CN | 107533472 A | 1/2018 |
| CN | 107534672 A | 1/2018 |
| CN | 108885568 A | 11/2018 |
| CN | 109478134 A | 3/2019 |
| CN | 109564525 A | 4/2019 |
| CN | 109564525 B | 5/2023 |
| CN | 112513813 B | 10/2024 |
| EP | 2663052 A1 | 11/2013 |
| EP | 3201762 A1 | 8/2017 |
| EP | 3254434 A1 | 12/2017 |
| EP | 3356938 A1 | 8/2018 |
| EP | 3201768 B1 | 12/2019 |
| EP | 3811209 A1 | 4/2021 |
| EP | 3814895 A1 | 5/2021 |
| EP | 3857375 A1 | 8/2021 |
| EP | 4064052 A1 | 9/2022 |
| JP | 2002-287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011-257847 A | 12/2011 |
| JP | 2012-078893 A | 4/2012 |

(56) References Cited

FOREIGN PATENT DOCUMENTS

| | | | |
|---|---|---|---|
| JP | 2012-104150 A | 5/2012 |
| JP | 2013-156996 A | 8/2013 |
| JP | 2014-525624 A | 9/2014 |
| JP | 2016-507100 A | 3/2016 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| JP | 7197612 B2 | 12/2022 |
| JP | 7210713 B2 | 1/2023 |
| JP | 7275171 B2 | 5/2023 |
| KR | 10-357850 B1 | 10/2002 |
| KR | 10-2021-0019533 A | 2/2021 |
| KR | 10-2541295 B1 | 6/2023 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005500 A1 | 1/2018 |
| WO | WO 2018/005829 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |
| WO | WO 2020/123439 A1 | 6/2020 |
| WO | WO 2020/264431 A1 | 12/2020 |
| WO | WO 2021/108435 A1 | 6/2021 |
| WO | WO 2023/107649 A1 | 6/2023 |

OTHER PUBLICATIONS

Anonymous: "Amazon Cognito Developer Guide," Jun. 24, 2001, XP093030075, retrieved from the internet: URL:https://web.archive.org/web/20210624153941if_/https://docs.aws.amazon.com/cognito/latest/developerguide/cognito-dg.pdf [retrieved on Mar. 9, 2023] the whole document.

Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.

Anonymous: "alias (command)—Wikipedia," Jun. 28, 2016, pp. 106, XP093089956, Retrieved from the Internet: URL:https://en.wikipedia.org/w/index.php?title=Alias_(command)&oldid=727315645 [retrieved on Oct. 9, 2023.

Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.

Anonymous: "AWS Lambda Developer Guide," Jul. 1, 2021, XP093024770, retrieved from the internet: URL:https://web.archieve.org/web/20210701100128if_/https://docs.aws.amazon.com/lambda/latest/dg/lambda-dg.pdf [retrieved on Feb. 17, 2023] the whole document.

Anonymous: "AWS Lambda Developer Guide," Jul. 1, 2021, XP093024770, retrieved from the internet: URL:https://web.archive.org/web/20210701100128if_/https://docs.aws.amazon.com/lambda/latest/dg/lambda-dg.pdf [retrieved on Feb. 17, 2023] the whole document.

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

Anonymous: SaaS Tenant Isolation Strategies Isolating Resources in a Multi-Tenant Environment,: Aug. 1, 2020, XP093030095, retrieved from the internet: URL:https://dl.awsstatic.com/whitepapers/saas-tenant-isolation-strategies.pdf [retrieved on Mar. 9, 2023] the whole document.

Anonymous: "Security Overview of AWS Lambda," Aug. 11, 2021, XP093030100, retrieved from the internet:URL:https://web.archive.org/web/20210811044132if_/https://docs.aws.amazon.com/whitepapers/latest/security-overview-aws-lambda/security-overview-aws-lambda.pdf [retrieved Mar. 9, 2023] the whole document.

Abebe et al., "EC-Store: Bridging the Gap Between Storage and Latency in Distribute Erasure Coded Systems", IEEE 38th International Conference on Distributed Computing Systems, 2018, pp. 255-266.

Adapter Pattern, Wikipedia,https://en.wikipedia.org/w/index.php?title=Adapter_pattern&oldid=654971255, [retrieved May 26, 2016], 6 pages.

Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages.

Amazon, "AWS Lambda: Developer Guide", Apr. 30, 2016 Retrieved from the Internet, URL:https://web.archive.org/web/20160430050158/http://docs.aws.amazon.com:80/lambda/latest/dg/lambda-dg.pdf, 346 pages.

Amazon, "AWS Lambda: Developer Guide", Retrieved from the Internet, 2019, URL : http://docs.aws.amazon.com/lambda/latest/dg/lambda-dg.pdf, 521 pages.

Balazinska et al., Moirae: History-Enhanced Monitoring, Published: Jan. 2007, 12 pages.

Bebenita et al., "Trace-Based Compilation in Execution Environments without Interpreters," ACM, Copyright 2010, 10 pages.

Ben-Yehuda et al., "Deconstructing Amazon EC2 Spot Instance Pricing", ACM Transactions on Economics and Computation 1.3, Sep. 2013, 15 pages.

Bhadani et al., Performance evaluation of web servers using central load balancing policy over virtual machines on cloud, Jan. 2010, 4 pages.

Bryan Liston, "Ad Hoc Big Data Processing Made Simple with Serverless Map Reduce", Nov. 4, 2016, Amazon Web Services <https :/laws. amazon .com/bl ogs/compute/ad-hoc-big-data-processi ng-made-si mple-with-serverless-mapred uce >.

CodeChef Admin discussion web page, retrieved from https://discuss.codechef.com/t/what-are-the-memory-limit-and-stack-size-on-codechef/14159, retrieved on Sep. 10, 2019.

CodeChef IDE web page, Code, Compile & Run, retrieved from https://www.codechef.com/ide, retrieved on Sep. 9, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, Nov. 2014, 13 pages.

Deis, Container, Jun. 2014, 1 page.

Dean et al, "MapReduce: Simplified Data Processing on Large Clusters", ACM, 2008, pp. 107-113.

Dombrowski, M., et al., Dynamic Monitor Allocation in the Java Virtual Machine, JTRES '13, Oct. 9-11, 2013, pp. 30-37.

Dornemann et al., "On-Demand Resource Provisioning for BPEL Workflows Using Amazon's Elastic Compute Cloud", 9th IEEE/ACM International Symposium on Cluster Computing and the Grid, 2009, pp. 140-147.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

(56) References Cited

OTHER PUBLICATIONS

Ekanayake et al, "Twister: A Runtime for Iterative MapReduce", ACM, 2010, pp. 810-818.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Fan et al., Online Optimization of VM Deployment in IaaS Cloud, Dec. 17, 2012-Dec. 19, 2012, 6 pages.
Ha et al., A Concurrent Trace-based Just-In-Time Compiler for Single-threaded JavaScript, utexas.edu, Jun. 2009.
Hammoud et al., "Locality-Aware Reduce Task Scheduling for MapReduce", IEEE, 2011, pp. 570-576.
Han et al., Lightweight Resource Scaling for Cloud Applications, May 13, 2012-May 16, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Huang, Zhe, Danny HK Tsang, and James She. "A virtual machine consolidation framework formapreduce enabled computing clouds." 2012 24th International Teletraffic Congress (ITC 24). IEEE, Sep. 4, 2012-Sep. 7, 2012.
Huang et al., "Erasure Coding in Windows Azure Storege", USENIX, 2012 in 12 pages.
Kamga et al., Extended scheduler for efficient frequency scaling in virtualized systems, Jul. 2012, 8 pages.
IBM, what is Serverless computing, https://www.ibm.com/topics/serverless#:-:test=Serverless%20is%20a%20cloud%20computing,managing%20servers%20or%20backend%20infrastructure, pp. 1-11 (Year: 2023).
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kim et al, "MRBench: A Benchmark for Map-Reduce Framework", IEEE, 2008, pp. 11-18.
Kraft et al., 10 performance prediction in consolidated virtualized environments, Mar. 2011, 12 pages.
Krsul et al., "VMPlants: Providing and Managing Virtual Machine Execution Environments for GridComputing", SuperComputing, 2004. Proceedings of the ACM/IEEESC 2004 Conference Pittsburgh, PA, XP010780332, Nov. 6-12, 2004, 12 pages.
Lagar-Cavilla et al., "SnowFlock: Virtual Machine Cloning as a First-Class Cloud Primitive", ACM Transactions on Computer Systems, vol. 29, No. 1, Article 2, Publication date: Feb. 2011, in 45 pages.
Lin, "MR-Apriori: Association Rules Algorithm Based on MapReduce", IEEE, 2014, pp. 141-144.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, Jul. 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.

Neenan, Sarah Compare Serverless tools and services in the Public cloud, https://www.techtarget.com/searchcloudcomputing/feature/Compare-serverless-tools-and-services-in-the-public-cloud, TechTarget, pp. 1-4 (Year: 2023).
Qian, H., and D. Medhi, et al., Estimating Optimal Cost of Allocating Virtualized Resources With Dynamic Demand, ITC 2011, Sep. 2011, pp. 320-321.
Rashmi et al., "EC-Cache: Load-Balance, Low-Latency Cluster Caching with Online Erasure Coding", USENIX, 2016, pp. 401-417.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Search Query Report from IP.com, performed Dec. 2, 2020.
Search Query Report from IP.com, performed May 27, 2021.
Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a-multi-tenant-saas-solution-using-aws-serverless-services/ [retrieved on Mar. 9, 2023] the whole document.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, Dec. 16, 2014-Dec. 19, 2014. Retrieved on Feb. 14, 2019, Retrieved from the internet: URL<https://Ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en .wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, from https://web.archive.org/web/20150326230100/https://en .wikipedia.org/wiki/Recursion_(computer_science), 2015.
Wikipedia: Serverless computing, https://en.wikipedia.org/wiki/Serverless_computing, pp. 107 (Year: 2023).
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, and Analysis, 2012, American Society for Engineering Education, Jun. 10, 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.

(56) References Cited

OTHER PUBLICATIONS

Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
Office Action in Chinese Application No. 202110268031.5, dated Sep. 3, 2021.
Office Action in Canadian Application No. 2,962,633 dated May 21, 2020.
Office Action in Canadian Application No. 2,962,633 dated Jun. 18, 2021.
Office Action in European Application No. 19199402.9 dated Mar. 23, 2021.
Office Action in European Application No. 19199402.9 dated Dec. 3, 2021 in 4 pages.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.
Office Action in Canadian Application No. 2,962,631 dated May 31, 2021.
Office Action in Indian Application No. 201717013356 dated Jan. 22, 2021.
Office Action in Japanese Application No. 2017-516168 dated Mar. 26, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
Office Action in Indian Application No. 201717019903 dated May 18, 2020.
International Search Report and Written Opinion in PCT/US2015/064071 dated Mar. 16, 2016.
International Preliminary Report on Patentability in PCT/US2015/064071 dated Jun. 6, 2017.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21, 2020.
International Search Report and Written Opinion in PCT/US2016/016211 dated Apr. 13, 2016.
International Preliminary Report on Patentability in PCT/US2016/016211 dated Aug. 17, 2017.
Office Action in Chinese Application No. 201680020768.2 dated May 14, 2021 in 23 pages.
Office Action in Chinese Application No. 201680020768.2 dated Sep. 24, 2021 in 20 pages.
First Examination Report for Indian Application No. 201717034806 dated Jun. 25, 2020.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
Office Action in Chinese Application No. 2016800562398 dated Jun. 18, 2021.
International Search Report and Written Opinion in PCT/US2016/054774 dated Dec. 16, 2016.
Office Action in European Application No. 16781265.0 dated Jul. 13, 2020.
Office Action in Indian Application No. 201817013748 dated Nov. 20, 2020.
International Preliminary Report on Patentability in PCT/US2016/054774 dated Apr. 3, 2018.
Office Action in Chinese Application No. 201680072794.X dated Jun. 22, 2021.
Office Action in European Application No. 16823419.3 dated Mar. 12, 2021.
International Search Report and Written Opinion in PCT/US2016/066997 dated Mar. 20, 2017.
International Preliminary Report on Patentability in PCT/US2016/066997 dated Jun. 26, 2018.
Office Action in Chinese Application No. 201780022789.2 dated Apr. 28, 2021.
Office Action in European Application No. 17776325.7 dated Apr. 12, 2021.
International Search Report and Written Opinion in PCT/US/2017/023564 dated Jun. 6, 2017.
International Preliminary Report on Patentability in PCT/US/2017/023564 dated Oct. 2, 2018.
First Office Action in Chinese Application No. 2017800451968 dated May 26, 2021.
Second Office Action in Chinese Application No. 2017800451968 dated Dec. 3, 2021 in 20 pages.
Office Action in European Application No. 17740533.9 dated May 4, 2021.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Office Action in European Application No. 17743108.7 dated Dec. 22, 2020.
International Search Report and Written Opinion mailed Oct. 15, 2019 for International Application No. PCT/US2019/039246 in 16 pages.
International Preliminary Report on Patentability mailed Dec. 29, 2020 for International Application No. PCT/US2019/039246 in 8 pages.
Office Action in Japanese Application No. 2020-572441 dated Dec. 22, 2021 in 8 pages.
International Search Report for Application No. PCT/US2019/038520 dated Aug. 14, 2019.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.

(56) References Cited

OTHER PUBLICATIONS

International Search Report for Application No. PCT/US2019/065365 dated Mar. 19, 2020.
International Preliminary Report on Patentability for Application No. PCT/US2019/065365 dated Jun. 8, 2021.
International Search Report for Application No. PCT/US2020/039996 dated Oct. 8, 2020.
International Preliminary Report on Patentability for Application No. PCT/US2020/039996 dated Jan. 6, 2022.
International Search Report for Application No. PCT/US2020/062060 dated Mar. 5, 2021.
International Preliminary Report on Patentability for Application No. PCT/US2020/062060 dated Jun. 9, 2022 in 9 pages.

EXECUTION OF AUXILIARY FUNCTIONS IN AN ON-DEMAND NETWORK CODE EXECUTION SYSTEM

CROSS-REFERENCE TO RELATED APPLICATIONS

This application is a continuation of U.S. patent application Ser. No. 17/107,663, filed Nov. 30, 2020, entitled "EXECUTION OF AUXILIARY FUNCTIONS IN AN ON-DEMAND NETWORK CODE EXECUTION SYSTEM," which is in turn a continuation of U.S. patent application Ser. No. 16/017,954, filed on Jun. 25, 2018, entitled "EXECUTION OF AUXILIARY FUNCTIONS IN AN ON-DEMAND NETWORK CODE EXECUTION SYSTEM" which is now U.S. Pat. No. 10,853,115, issued on Dec. 1, 2020, the disclosures of which are incorporated herein by reference.

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
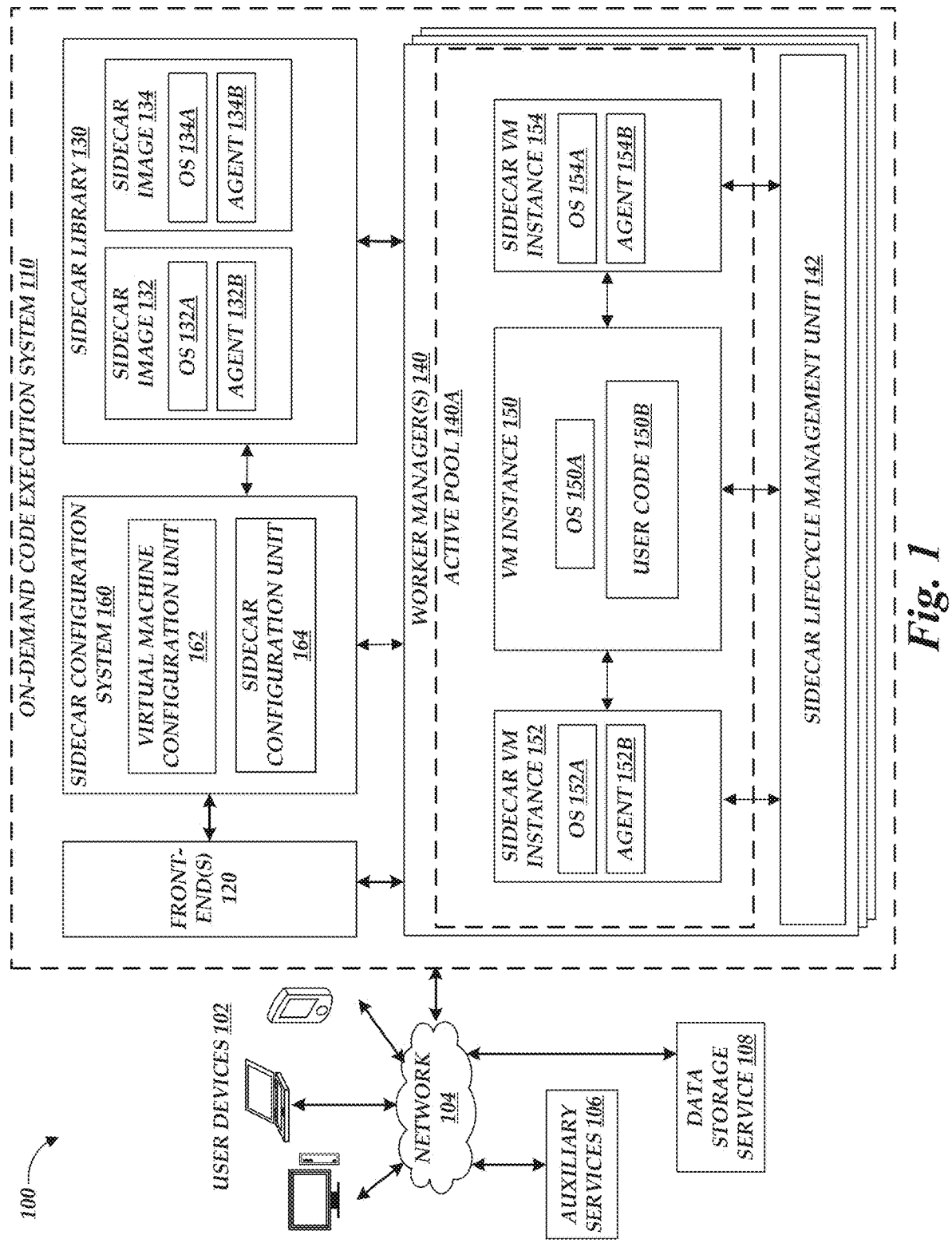
FIG. 1 is a block diagram depicting an illustrative environment in which an on-demand code execution system can operate to execute tasks corresponding to code, which may be submitted by users of the on-demand code execution system, and to provision and execute sidecar virtual machine instances to facilitate execution of the submitted code.

Generally described, aspects of the present disclosure relate to an on-demand code execution system. The on-demand code execution system enables rapid execution of code, which may be supplied by users of the on-demand code execution system. More specifically, embodiments of the present disclosure relate to implementing auxiliary functions for an on-demand code execution system through the use of "sidecar" virtual machine instances. As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code execution system may instantiate virtual machine instances to execute the specified tasks on demand. The on-demand code execution system may further instantiate "sidecar" virtual machine instances, which enable users to control or monitor the execution of a task and the virtual machine instance upon which it executes. Illustratively, a sidecar virtual machine instance (which may be referred to herein as a "sidecar") may implement one or more functions for controlling, securing, filtering, monitoring, or managing the virtual machine instance that executes the task code. By implementing these functions in a sidecar or sidecars, the on-demand code execution system can effectively separate these functions from the virtual machine instances executing task code. The sidecar implementation thus improves efficiency with regard to resource utilization, since (as described in more detail below) the sidecars can be made available only when needed. The sidecar implementation further improves security for individual users, since an attacker who compromises one sidecar does not gain access to the sidecars or virtual machine instances of other users.

As used herein, "auxiliary functions" may refer generally to functions that facilitate the execution of user-submitted task code. For example, auxiliary functions may include encapsulation, logging, tracing, debugging, scanning, profiling, validating input, validating output, or other functions that relate to task code execution. It will be understood by one skilled in the art, however, that these examples are not limiting and that sidecars performing other functions are within the scope of the present disclosure. In some embodiments, auxiliary functions may include control plane functions that execute with administrator-level privileges. Sidecars may be instantiated to perform these functions on a per-user, per-task, or per-call basis, and may thus provide individual users with access to individualized control planes for their virtual machine instances. For example, a sidecar that encapsulates network traffic may be made available to individual users, and may translate packets that are transported on a physical substrate network to a virtual network that the user can access from the user's virtual machine instance. The on-demand code execution system can thus provide network encapsulation via a sidecar, and can do so without allowing a virtual machine instance that runs user code to access the substrate network and potentially de-encapsulate the traffic of other users.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the limited nature of computing resources with which to execute code, the resource overhead associated with providing "always-on" auxiliary functionality, the inefficiencies caused by provisioning functionality that is not utilized, and the security issues caused by providing a common control plane to multiple users. These technical problems are addressed by the various technical solutions described herein, including the provisioning of an execution environment with sidecar virtual machine instances that provide user-specific or task-specific functionality. Thus, the present disclosure represents an improvement on existing data processing systems and computing systems in general.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance, and provisioning the containers with code of the task as well as an dependency code objects. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (e.g., including metadata identifying dependency code objects for the uploaded code), invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus over-paying). In accordance with embodiments of the present disclosure, and as described in more detail below, the on-demand code execution system 110 may configure the virtual machine instances with customized operating systems to execute the user's code more efficiency and reduce utilization of computing resources.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To facilitate execution of tasks, the on-demand code execution system 110 includes one or more sidecar libraries 130, which in turn include one or more sidecar images. In the example illustrated in FIG. 1, the sidecar library 130 includes a sidecar image 132, which comprises an operating system 132A and an agent 132B, and a sidecar image 134, which comprises an operating system 134A and an agent 134B. In some embodiments, the operating system 132A and the operating system 134A may be the same operating system. As described in more detail below, the agents 132B and 134B may perform one or more auxiliary functions when configured to communicate with a virtual machine instance or instances. In some embodiments, the sidecar library 130 contains only agents that perform auxiliary functions (e.g., agents 132B and 134B), and a sidecar is created by provisioning a virtual machine instance with one or more of the agents from the sidecar library 130.

The on-demand code execution system 110 further includes a sidecar configuration system 160, which implements aspects of the present disclosure including, for example, the determination and configuration of virtual machine instances and sidecar instances for a particular task.

In some embodiments, the sidecar configuration system 160 includes a virtual machine configuration unit 162, which may be invoked when the user submits code via the frontend 120 to determine a virtual machine configuration to use with the submitted code. As described in more detail below, the virtual machine configuration unit 162 may analyze the user's code and identify, for example, operating system "hooks," input and/or output redirections, or other modifications to facilitate interactions between a virtual machine instance and various sidecars before, during, and/or after execution of the user-submitted code. In various embodiments, the virtual machine configuration unit 162 may analyze the user's code or process user requests to determine a virtual machine configuration. In further embodiments, the on-demand code execution system 110 includes a sidecar configuration unit 164, which may identify the sidecars to be provisioned along with any configuration of the sidecars to facilitate interaction with the virtual machine instance(s). The sidecar configuration unit 164 may identify, for example, input validations that a sidecar should perform, and may configure a sidecar to perform them. For example, the user-submitted code may process input data in a particular format, and a thus a sidecar configuration may be determined to validate that the input data is in the format.

The on-demand code execution system further includes one or more worker managers 140 that manage the instances used for servicing incoming calls to execute tasks, and that manage the sidecars used to provide auxiliary functions for these instances. In the example illustrated in FIG. 1, each worker manager 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art. In accordance with embodiments of the present disclosure, the worker manager 140 can obtain a virtual machine configuration and/or sidecar configurations when provisioning a virtual machine instance.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the virtual machine instance 150. The instance 150 includes an operating system 150A and user code 150B. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool (e.g., including the number and type of instances). In other embodiments, the worker managers 140 requests compute capacity from a warming pool manager without having knowledge of the virtual machine instances in a warming pool.

The active pool 140A may further include one or more sidecar virtual machine instances, such as sidecar 152 and sidecar 154. As depicted in FIG. 1, the sidecar 152 includes an OS 152A and an agent 152B, and the sidecar 154 includes an OS 154A and an agent 154B. In some embodiments, one or both of the sidecars 152 and 154 may correspond to a provisioned instance of a sidecar image 132 or 134 from the sidecar library 130. The sidecars 152 and 154 may, as described in more detail below, provide one or more auxiliary functions in conjunction with the virtual machine instance 150 that executes user code 150B.

The worker manager 140 may further include a sidecar lifecycle management unit 142. As described in more detail below, the sidecar lifecycle management unit 142 may monitor the lifecycles of virtual machine instances, such as virtual machine instance 150, and may ensure that the lifecycles of corresponding sidecar instances (e.g., sidecars 152 and 154) are synchronized with the virtual machine instance(s) to which they are attached. As described below, the sidecar lifecycle management unit 142 may determine whether a particular sidecar should precede, follow, or change its execution state in parallel when a virtual machine instance undergoes a change in execution state, and may cause sidecars to implement changes in execution state accordingly. In some embodiments, the sidecar lifecycle management unit 142 may be a component of the active pool 140A. In other embodiments, the sidecar lifecycle management unit 142 may sit outside the active pool 140A and facilitate the addition, removal, and/or the timing of the addition or removal of sidecars from the active pool 140A.

While some functionalities are generally described herein with reference to an individual component of the on-demand code execution system 110, other components or a combination of components may additionally or alternatively implement such functionalities. For example, a worker manager 140 may operate to configure virtual machine instances in a manner similar or identical to as described herein with reference to an OS configuration system 160. One skilled in the art will also understand that the present disclosure is not limited to the embodiment depicted in FIG. 1, in which one virtual machine instance 150 is in communication with two sidecars 152 and 154. In various embodiments, any number of sidecars may be in communication with any number of virtual machine instances, including one-to-many and many-to-many relationships between virtual machine instances and sidecars.

Figure 2:
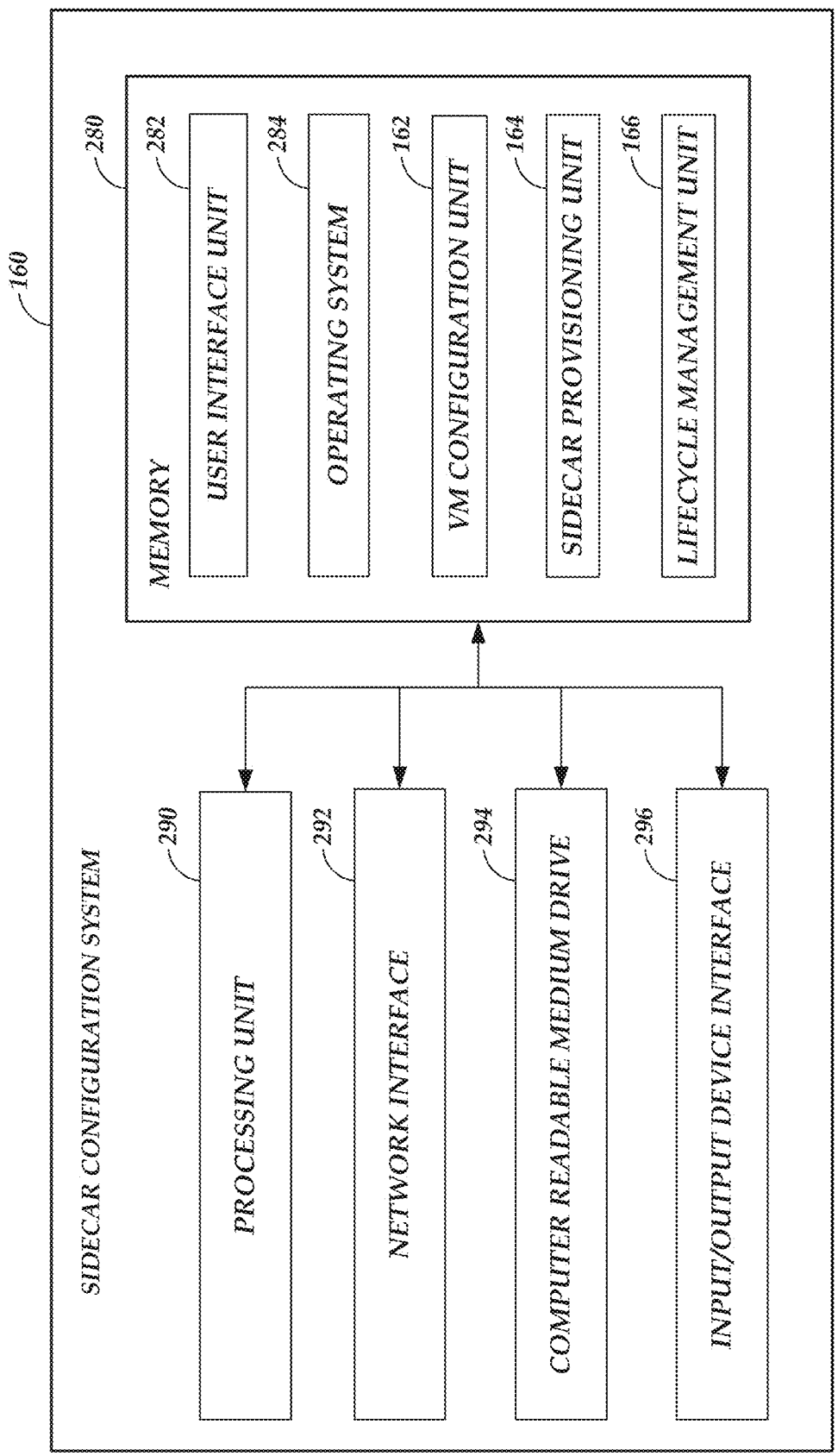
FIG. 2 depicts a general architecture of a computing device providing a sidecar configuration system that is configured to facilitate configuration of sidecar virtual machine instances used to facilitate execution of tasks on the on-demand code execution system of FIG. 1.

FIG. 2 depicts a general architecture of a computing system (referenced as sidecar configuration system 160) that operates to determine sidecar configurations within the on-demand code execution system 110. The general architecture of the sidecar configuration system 160 depicted in FIG. 2 includes an arrangement of computer hardware and software modules that may be used to implement aspects of the present disclosure. The hardware modules may be implemented with physical electronic devices, as discussed in greater detail below. The sidecar configuration system 160 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the sidecar configuration system 160 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the sidecar configuration system 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a virtual machine configuration unit 162 and a sidecar configuration unit 164 that may be executed by the processing unit 290. In one embodiment, the virtual machine configuration unit 162 and the sidecar configuration unit 164 individually or collectively implement various aspects of the present disclosure, e.g., generating or selecting sidecar configurations within the on-demand code execution system 110, determining virtual machine configurations, etc., as described further below.

While the virtual machine configuration unit 162 and the sidecar configuration unit 164 are shown in FIG. 2 as part of the sidecar configuration system 160, in other embodiments, all or a portion of the virtual machine configuration unit 162 and the sidecar configuration unit 164 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the sidecar configuration system 160.

In some embodiments, the sidecar configuration system 160 may further include components other than those illustrated in FIG. 2. For example, the memory 280 may further include an instance allocation unit for allocating execution environments to tasks, user code execution unit to facilitate execution of tasks within the execution environments, or a container manager for managing creation, preparation, and configuration of containers within virtual machine instances.

Figure 3:
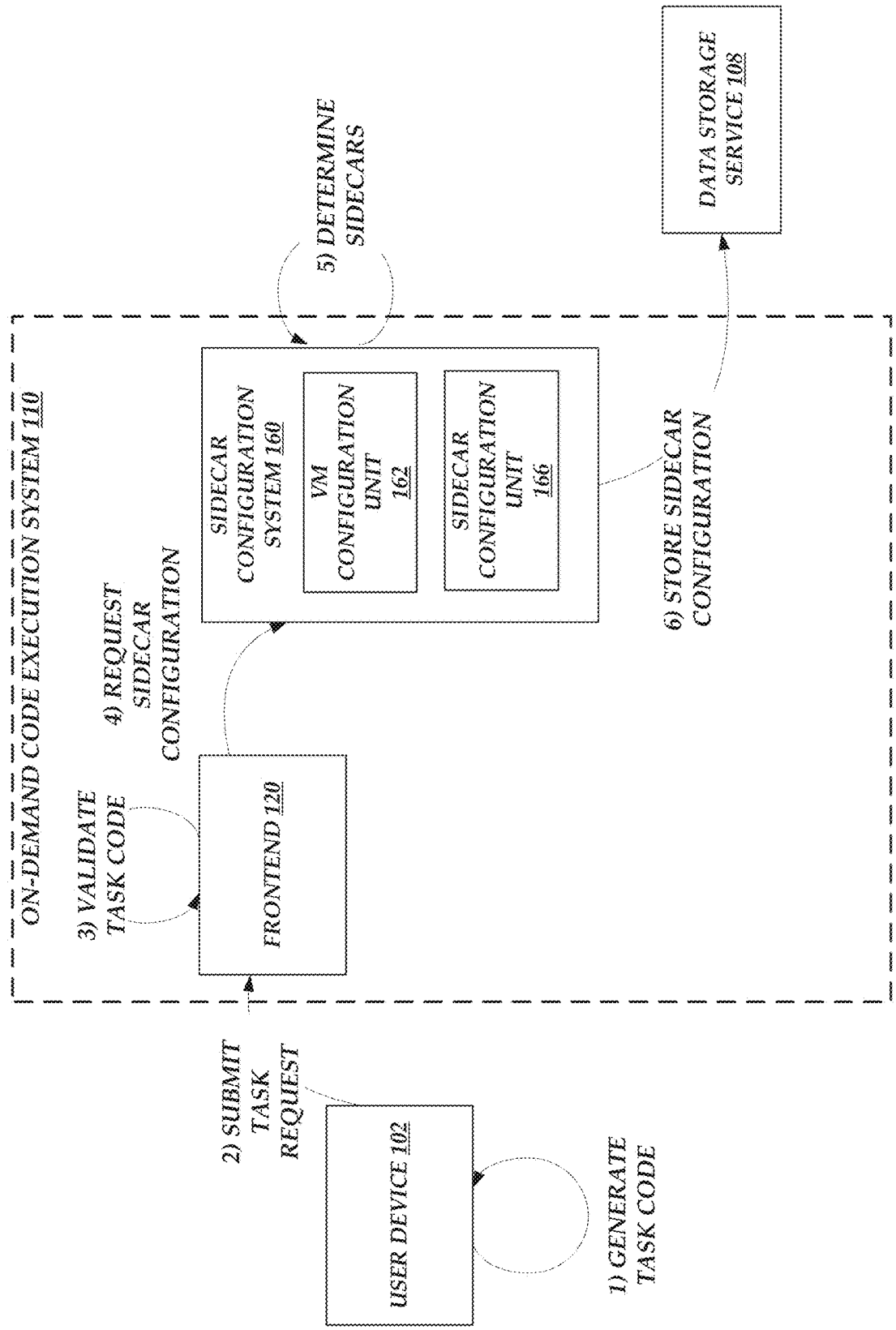
FIG. 3 is a flow diagram depicting illustrative interactions for submitting code corresponding to a task to the on-demand code execution system of FIG. 1, and for the on-demand code execution system to determine sidecar configurations to facilitate execution of the task on the on-demand code execution system.

With reference to FIG. 3, illustrative interactions are depicted for determining and configuring the sidecars for an execution of user-submitted code. The interactions of FIG. 3 begin at (1), where a user device 102 may generate a request to execute task code on an on-demand code execution system 110. Illustratively, the user may generate code whose execution requires various auxiliary functions, and thus requires a sidecar or sidecars that provide these functions. In some embodiments, the user may generate or identify a list of auxiliary functions that the user expects to require during execution of the task code. At (2), the user device 102 submits the request to the frontend 120, such as by using a API or other interface of the frontend 120. The request may include, for example, the task code and a list of sidecars or auxiliary functions. At (3), the frontend 120 validates the submitted task code. Validation can include, for example, verifying that the task code can be executed by the on-demand code execution system 110.

At (4), the frontend 120 transmits a request to the sidecar configuration system 160 to determine a set of sidecars for the task. Thereafter, at (5), the sidecar configuration system 160 determines a suitable set of sidecars. Illustratively, the virtual machine configuration unit 162 of the sidecar configuration system 160 may analyze the request to identify a set of sidecar virtual machine instances that will facilitate executing the task code. The sidecar configuration unit 164 may then configure the virtual machine instance and the sidecars that will be needed during task code execution. For example, the sidecar configuration system 160 may determine that the task code will require input validation during execution. The virtual machine configuration unit 162 may thus configure a virtual machine instance to receive processed input from a sidecar, and the sidecar configuration unit 164 may identify and configure a sidecar to perform the necessary input validation. As a further example, the sidecar configuration system 160 may determine that the user wishes to profile execution of the task code to determine whether and how the code can be optimized. The virtual machine configuration unit 162 may thus configure a virtual machine instance to output profiling data during task execution, and the sidecar configuration unit 164 may configure a sidecar that aggregates and reports the profiling data.

At (6), the sidecar configuration system may store the determined sidecar configuration, and the validated task code, in a storage device such as the data storage device 108. The on-demand code execution system 110 may thus reduce the time spent analyzing code and determining sidecar configurations when receiving further requests to execute the task code, as discussed in more detail below. In some embodiments, the on-demand code execution system 110 may determine sidecars on a per-request basis. For example, the request may contain a debugging flag or other information that indicates whether to include a particular sidecar when executing the task code.

In some embodiments, the ordering and implementation of operations described above may be modified, or these interactions may be carried out by additional or alternative elements of the on-demand code execution system 110. For example, in one embodiment, the virtual machine configuration unit 162 and the sidecar configuration unit 164 may be combined, and the determinations made by these units may be collectively considered a "sidecar configuration" that includes configuration of the virtual machine that executes the task code. As a further example, in another embodiment, the user device 102 may request a particular sidecar configuration for the submitted task code, and the sidecar configuration system 160 may validate, process, and/or implement this request.

Figure 4:
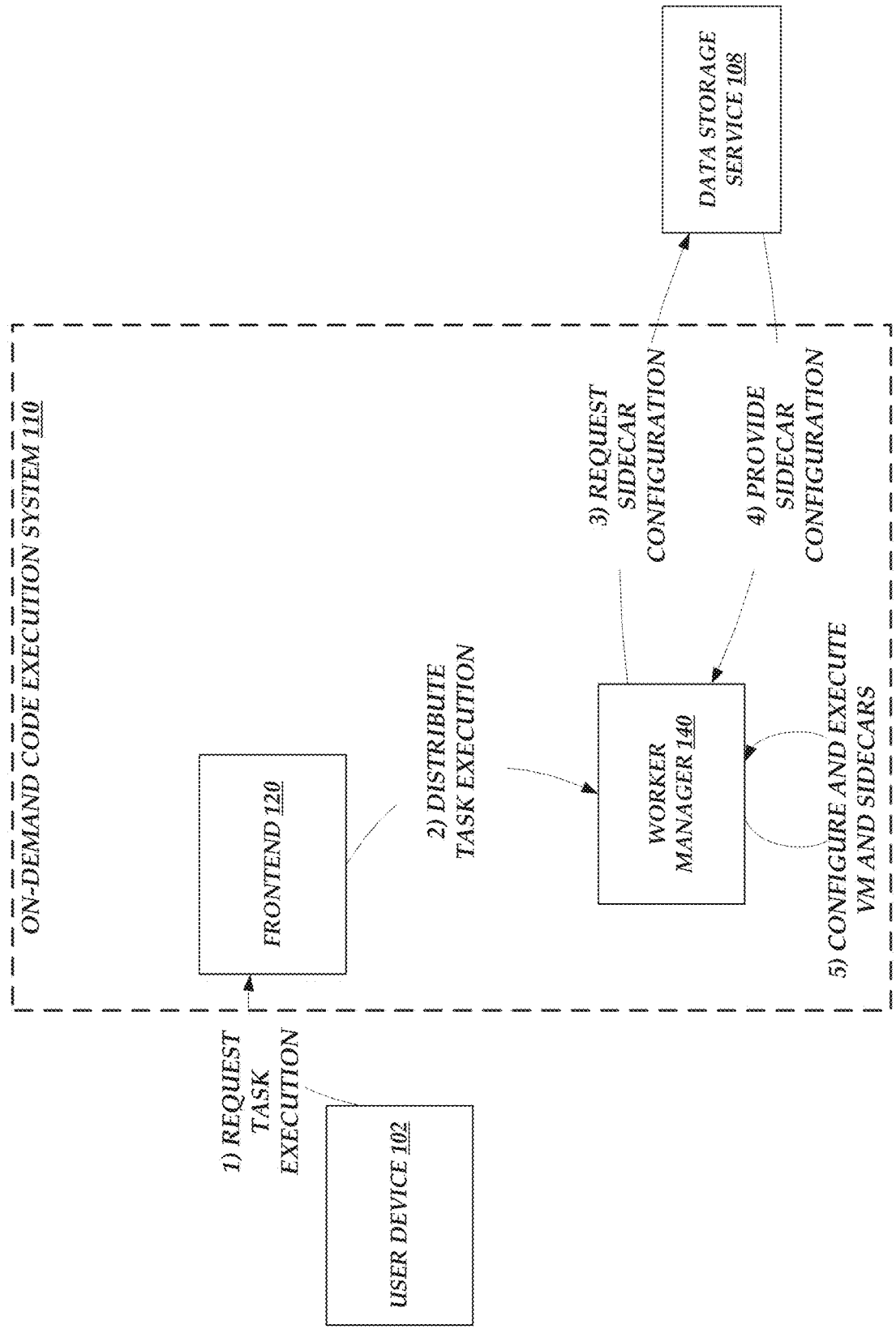
FIG. 4 is a flow diagram depicting illustrative interactions for executing a task utilizing the determined sidecar configuration provided on the on-demand code execution system of FIG. 1.

Illustrative interactions for utilizing a predetermined sidecar configuration in conjunction with executing tasks on the on-demand code execution system 110 will be described with reference to FIG. 4. At (1), the user device 102 may request task execution. In some embodiments, as described above, the frontend 120 may initiate task execution without receiving a request, in which case the interaction at (1) may be omitted.

At (2), the frontend 120 distributes the task for execution to the worker manager 140. Prior to distributing the task execution, the frontend 120 may undertake any of a number of additional interactions, such as queuing the request, validating the request, etc., as described in more detail within the '556 Patent, incorporated by reference above.

At (3), the worker manager 140 requests a sidecar configuration for the task. In some embodiments, as described above, a sidecar configuration may be determined when the code of the task is submitted for validation (e.g., by carrying out the interactions illustrated in FIG. 3). In other embodiments, a sidecar configuration may be provided by the user when the code of the task is submitted for validation. In further embodiments, a sidecar configuration may be determined on a per-request basis. At (4), the worker manager 140 receives the previously determined (or previously specified) sidecar configuration from the data storage device 108.

Thereafter, at (5), the worker manager 140 configures and executes a virtual machine instance and sidecars in accordance with the received sidecar configuration. In some embodiments, as described above, the worker manager 140 may obtain sidecar images from a library, such as the sidecar library 130 of FIG. 1, and configure these images in accordance with the configuration. In other embodiments, the worker manager 140 may obtain fully or partially preconfigured sidecars from a warming pool, and may perform additional configurations as needed (e.g., to cause the sidecar to communicate with a particular virtual machine instance). In still further embodiments, the worker manager 140 may obtain multiple virtual machine instances from a warming pool, and may configure some of the instances to execute task code and configure other instances to be sidecars (e.g., by provisioning the sidecar instances with agents that perform auxiliary functions).

Illustrative interactions for managing the lifecycles of sidecars in conjunction with the lifecycle of a "main" virtual machine instance (e.g., one that executes task code) will be described with reference to FIG. 5. At (1), the sidecar lifecycle management unit 142 monitors the execution of the virtual machine instance 150. Illustratively, the sidecar lifecycle management unit 142 may monitor inputs, outputs, resource utilization, metrics generated by the virtual machine instance 150, metrics generated by the worker manager 140, or other information relating to the status of the virtual machine instance 150.

At (2), the sidecar lifecycle management unit 142 detects that the virtual machine instance 150 is about to undergo a change in execution state. Changes in execution state may include, for example, provisioning the virtual machine instance 150, starting execution of the task code, suspending execution of the task code, resuming execution of the task code, terminating execution of the task code, suspending the virtual machine instance 150, resuming the virtual machine instance 150, deprovisioning the virtual machine instance 150, and the like. Terminating execution of the task code may include both normal termination (e.g., the task code executing to completion) and abnormal termination (e.g., the task code halting execution due to an error, because the user requested termination, because a signal was received from the operating system, etc.). In some embodiments, the sidecar lifecycle management unit 142 detects a pending change in execution state prior to its occurrence. For example, the sidecar lifecycle management unit 142 may receive a notification that the worker manager 140 is provisioning, or is about to provision, the virtual machine instance 150. In other embodiments, the sidecar lifecycle management unit 142 may detect the change while or after it occurs. For example, the sidecar lifecycle management unit 142 may detect that the virtual machine instance has suspended or terminated execution of the task code because the task code has processed all of the available input data, because a threshold amount of computing resources has been consumed, or because the task code has exited with an error message.

Thereafter, at (3), the sidecar lifecycle management unit 142 determines what changes should occur to the execution states of sidecars associated with the virtual machine instance 150, such as sidecars 152 and 154. The changes in execution states for the sidecars may be determined based on multiple factors, such as the number of virtual machine instances associated with the sidecar, the auxiliary function (s) performed by the sidecar, and so forth. For example, the sidecar 152 may provide output validation for the virtual machine instance 150. The sidecar lifecycle management unit 142 may therefore determine that the sidecar 152 can enter an inactive state when the virtual machine instance 150 enters an inactive state, since the output validation function will not be required. As another example, the sidecar 154 may provide control plane functions to both the virtual machine instance 150 and another virtual machine instance, which may execute the same task code or different task code on behalf of the same user. The sidecar lifecycle management unit 142 may thus determine that the sidecar 154 should only be deprovisioned if both of the virtual machine instances it supports have entered a deprovisioned state.

In some embodiments, the sidecar lifecycle management unit 142 may determine an order in which sidecar(s) and the virtual machine instance 150 should change their execution states, and may cause the execution states to change in the determined order. For example, the sidecar 154 may provide logging or debugging functions for the virtual machine instance 150. The sidecar lifecycle management unit 142 may thus determine that the sidecar 154 should enter a suspended execution state only after the virtual machine instance 150 does so, and should resume execution before the virtual machine instance 150 does so, in order to permit the sidecar 154 to maintain a complete record of logging or debugging information. As another example, the sidecar 152 may process and validate input data before sending it to the virtual machine instance 150, and thus the virtual machine instance 150 must be active before the sidecar 152 begins sending data to it. In some embodiments, the sidecar lifecycle management unit 142 may not have control over the timing of changes in the execution state of the virtual machine instance 150, and may thus schedule and prioritize changes to sidecar execution states based on the timing of changes in the execution state of the virtual machine instance 150.

Figure 5:
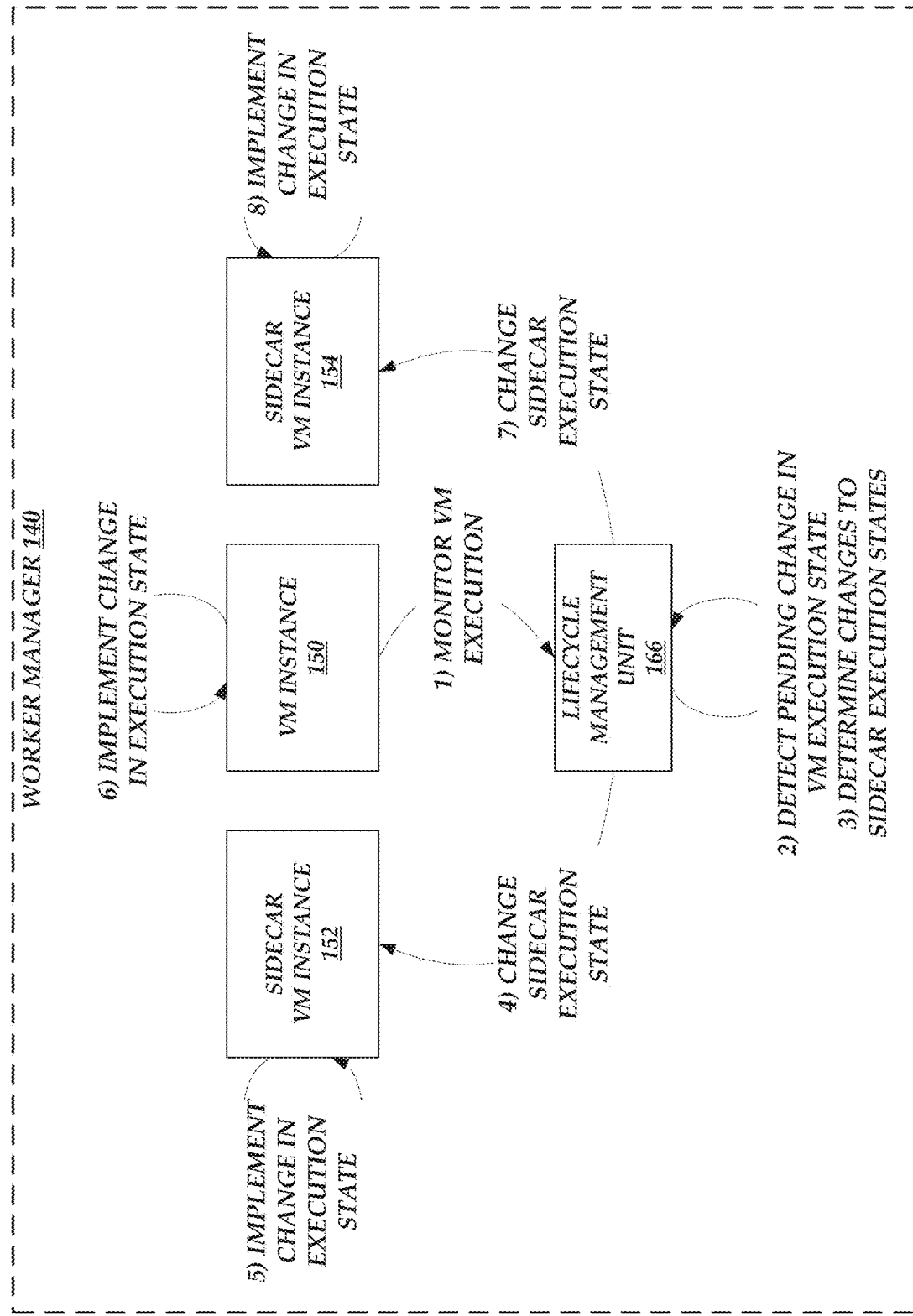
FIG. 5 is a flow diagram depicting illustrative interactions for managing the lifecycles of sidecar virtual machine instances on the on-demand code execution system of FIG. 1.

In the example illustrated in FIG. 5, the sidecar lifecycle management unit 142 determines that a change in the execution state of the sidecar 152 should precede the change in the execution state of the virtual machine instance 150, and that a change in the execution state of the sidecar 154 should follow the change to the virtual machine instance 150. The sidecar lifecycle management unit 142 therefore, at (4), causes the sidecar 152 to change its execution state. In various embodiments, the sidecar lifecycle management unit 142 may cause the change in execution state by sending instructions to the sidecar 152, the worker manager 140, or another component of the on-demand code execution system 110. At (5), the sidecar 152 (or another component) implements the change in execution state.

Thereafter, at (6), the virtual machine instance 150 implements its change in execution state. In some embodiments, the worker manager 140 implements the change in the virtual machine instance 150 execution state, for example by provisioning or deprovisioning the virtual machine instance 150. In other embodiments, the virtual machine instance 150 may implement the change. For example, the virtual machine instance 150 may begin, end, suspend, or resume execution of the task code.

At (7), the sidecar lifecycle management unit 142 causes a change in the execution state of the sidecar 154, in similar fashion to the interaction at (4). Thereafter, at (8), the sidecar 154 (or another component of the on-demand code execution system 110) implements the change in execution state for the sidecar 154.

In some embodiments, one or more of the interactions at (4), (6), and (7) may be consolidated into a single interaction. For example, the sidecar lifecycle management unit 142 may provide the worker manager 140 with a schedule or an ordered list for changing the execution states of the sidecar 152, virtual machine instance 150, and sidecar 154, and the worker manager 140 may implement the execution state changes in the indicated order. As another example, the sidecar lifecycle management unit 142 may indicate to the worker manager 140 that the sidecar 152 should resume execution prior to the virtual machine instance 150, and the sidecar 154 should resume after the virtual machine instance 150 resumes execution. Additionally, as discussed above, in some embodiments the interaction at (2) may detect a change that is occurring or has already occurred, rather than detecting a change that is about to occur.

Figure 6:
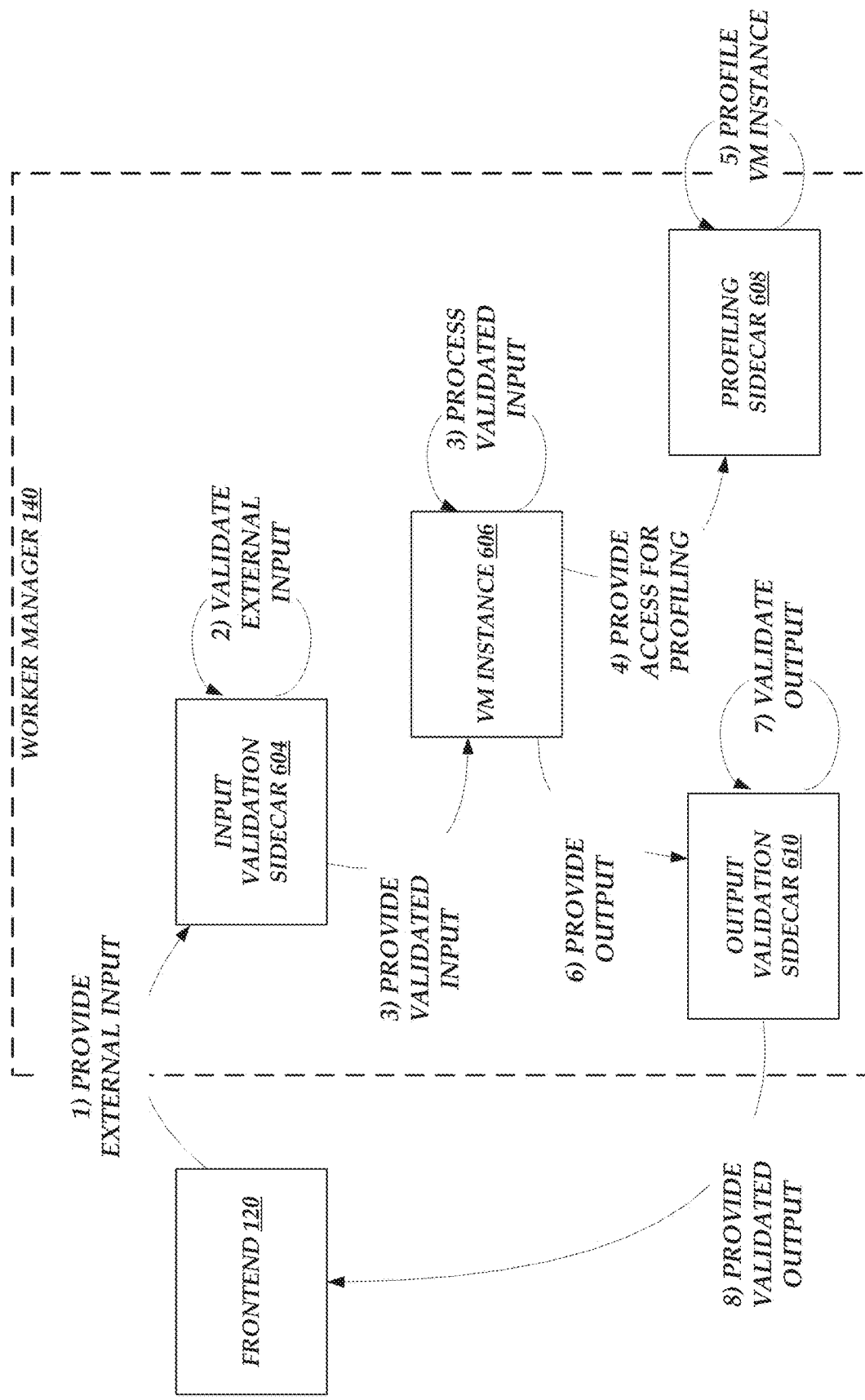
FIG. 6 is a flow diagram depicting illustrative interactions between sidecar virtual machine instances and virtual machine instances that execute code corresponding to tasks on the on-demand code execution system of FIG. 1.

FIG. 6 depicts an illustrative example of interactions between a virtual machine instance 604 and sidecars 606, 608, and 610. In the illustrated example, at (1), external input is provided to an input validation sidecar 606. The external input may be received from the frontend 120, or in some embodiments from another input source. At (2), the input validation sidecar 606 may validate the external input. For example, the input validation sidecar 606 may sanitize the external input (e.g., by inserting escape characters or removing special characters) or verify that the external input is in a format expected by the task code.

Thereafter, at (3), the input validation sidecar 606 may provide validated input to the virtual machine instance 604. In some embodiments, the virtual machine instance 604 may be configured to receive input from the input validation sidecar 606. In other embodiments, the sidecar 606 may be configured to transmit processed input to the virtual machine instance 604, and no special configuration is performed on the virtual machine instance 604: Instead, the task code executing on the virtual machine instance 604 simply processes any input it receives, and the configuration of only receiving input from sidecar 606 is transparent to the virtual machine instance 604. In further embodiments, neither the input validation sidecar 606 nor the virtual machine instance 604 may be configured to be aware of the other, and the communication of validated data from the sidecar 606 to the virtual machine instance 604 may be handled by the worker manager 140.

At (4), the virtual machine instance 604 may process the validated input. Illustratively, the virtual machine instance 604 may process the validated input by executing the task code with the validated input, and may generate corresponding output. The virtual machine instance 604 may also, at (5), provide access to information that allows a profiling sidecar 608 to profile the task code. For example, the virtual machine instance 604 may generate log files, metrics, stack traces, memory dumps, or other data relating to the execution of the task code. The virtual machine instance 604 may then transmit the data, provide APIs for accessing the data, allow the profiling sidecar 608 to read filesystems or memory locations, or otherwise grant access to the profiling information. At (6), the profiling sidecar may obtain and/or receive the profiling information and process it to profile the virtual machine instance 604 and/or the task code executing on the virtual machine instance 604.

At (7), the virtual machine instance 604 may provide the output generated at (4) to an output validation sidecar 610, which at (8) may validate the output. For example, the output validation sidecar 610 may post-process the output, convert it to a particular format, verify that it falls within a specified range, or perform other validations.

At (9), in some embodiments, the output validation sidecar 610 may provide validated output to the frontend 120 or another component. In some embodiments, the interactions at (1)-(9) may be repeated until no further input is available or the user issues a request to stop executing the task code. Additionally, the example interactions depicted in FIG. 6 may be carried out in different orders, or more or fewer interactions may be carried out. For example, the interactions at (5) and (6) may be omitted, or may be carried out prior to (or concurrently with) the interaction at (4). As a further example, in some embodiments, the validated input produced by the input validation sidecar 606 may be provided as input to another input validation sidecar, which may perform further validations before sending the resulting data to the virtual machine instance 604. It will thus be understood by one skilled in the art that many other combinations and arrangements of sidecars are within the scope of the present disclosure.

Figure 7:
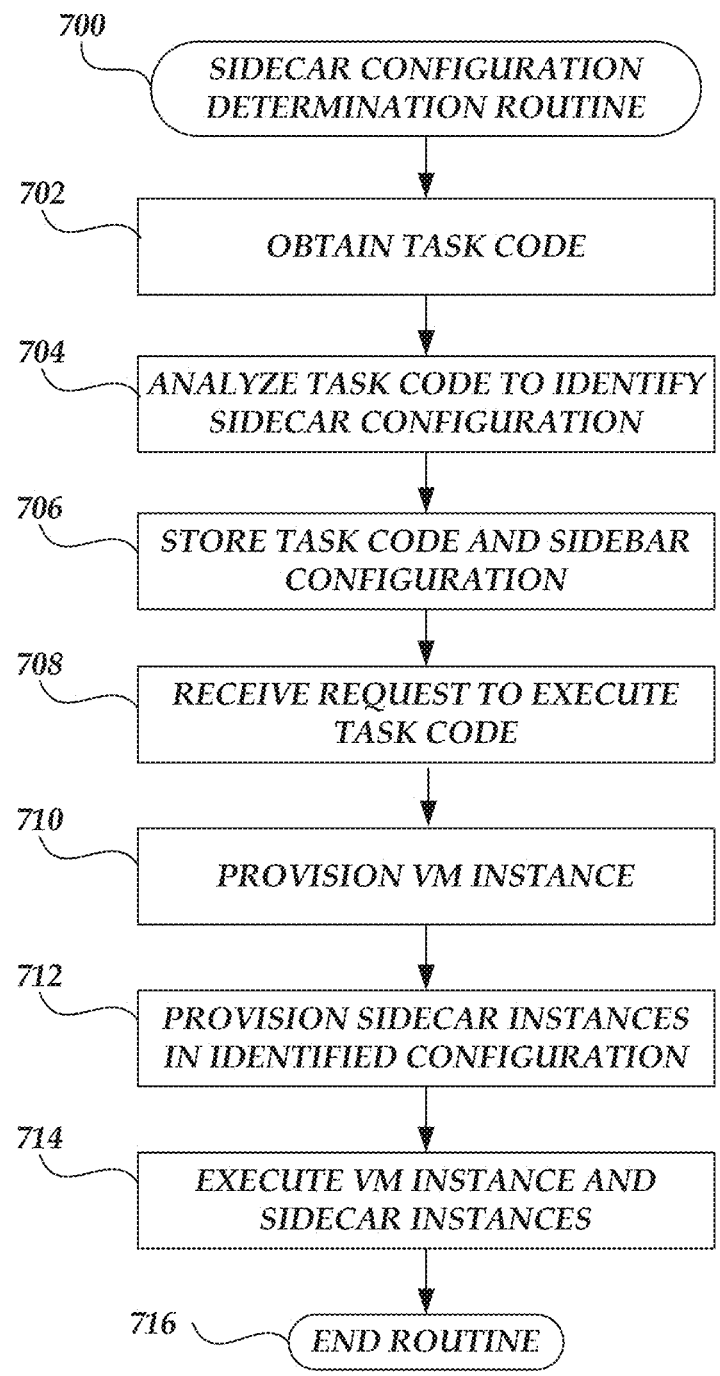
FIG. 7 is a flow chart depicting an illustrative routine for determining a sidecar configuration based on code submitted to the on-demand code execution system of FIG. 1.

With reference to FIG. 7, one illustrative routine 700 for determining a sidecar configuration for executing a task on the on-demand code execution system 110 will be described. The routine 700 may be carried out, for example, by the sidecar configuration system 160 of FIG. 1. In one embodiment, the routine 700 (e.g., blocks 702-706) is carried out in conjunction with the creation of a task on the on-demand code execution system 110. In another embodiment, all or part of the routine 700 (e.g., blocks 708-716) may be carried out in conjunction with executing the task on the on-demand code execution system 110. All or part of the routine 700 may additionally or alternatively be carried out at other times, such as periodically (e.g., once per day, week, month, etc.) or based on detection that execution metrics or resource utilization metrics fall outside a threshold.

The routine 700 begins at block 702, where the sidecar configuration system 160 obtains code for a task (e.g., as submitted by a user). In one embodiment, the code for the task is represented as a code object, such as a compressed file including source code for the task. The routine 700 then continues to block 704, where the sidecar configuration system 160 determines an sidecar configuration for the task. As described above, the sidecar configuration system 160 may, in some embodiments, determine a sidecar configuration based on the submitted task code. In other embodiments, the sidecar configuration system 160 may determine a sidecar configuration based on user input, such as a request to profile execution of the task code or validate input provided to the task code. In some embodiments, the frontend 120 or another component of the on-demand code execution system 110 may present user interfaces that enable a user to select desired sidecars.

At block 706, the sidecar configuration system 160 may store the task code and the sidecar configuration in a data store, such as the data store service 108. In some embodiments, as described above, the sidecar configuration may include a configuration of the virtual machine instance that executes the task code. In other embodiments, the sidecar configuration may include instructions utilized by the worker manager 140.

Thereafter, at block 708, a request to execute the task code may be received. The request may be received by, for example, the frontend 120, the worker manager 140, or another component of the on-demand code execution system 110. In some embodiments, as described above, the task code may be executed without receiving a request, in which case block 708 may be omitted.

At block 710, the worker manager 140 provisions a virtual machine instance to execute the task code. In some embodiments, the worker manager 140 configures the virtual machine instance in accordance with the sidecar configuration. For example, the worker manager 140 may configure the virtual machine instance to accept input from a sidecar, provide output to a sidecar, provide access to internals of the virtual machine (e.g., stack or memory contents), or otherwise configure the virtual machine instance to work with sidecars. In other embodiments, the virtual machine instance may not be configured and the interactions with sidecars may be transparent to the virtual machine instance.

At block 712, the worker manager 140 provisions one or more sidecars in accordance with the sidecar configuration. In some embodiments, as described above, the worker manager 140 obtains sidecar images or agents from a library, such as the sidecar library 130, and uses these images or agents to provision and configure the sidecars. In other embodiments, the sidecar configuration may include instructions for provisioning a sidecar to user specifications, and the worker manager 140 may carry out these instructions to provision the sidecar accordingly.

At block 714, the worker manager 140 executes the virtual machine instance and the sidecar instance(s). In some embodiments, the worker manager 140 proceeds to manage the lifecycles of the virtual machine instance and the sidecar instance(s) by carrying out a routine such as the routine 800 described below with reference to FIG. 8. In other embodiments, the routine 700 ends with the execution of the provisioned virtual machine instances and sidecar(s).

Figure 8:
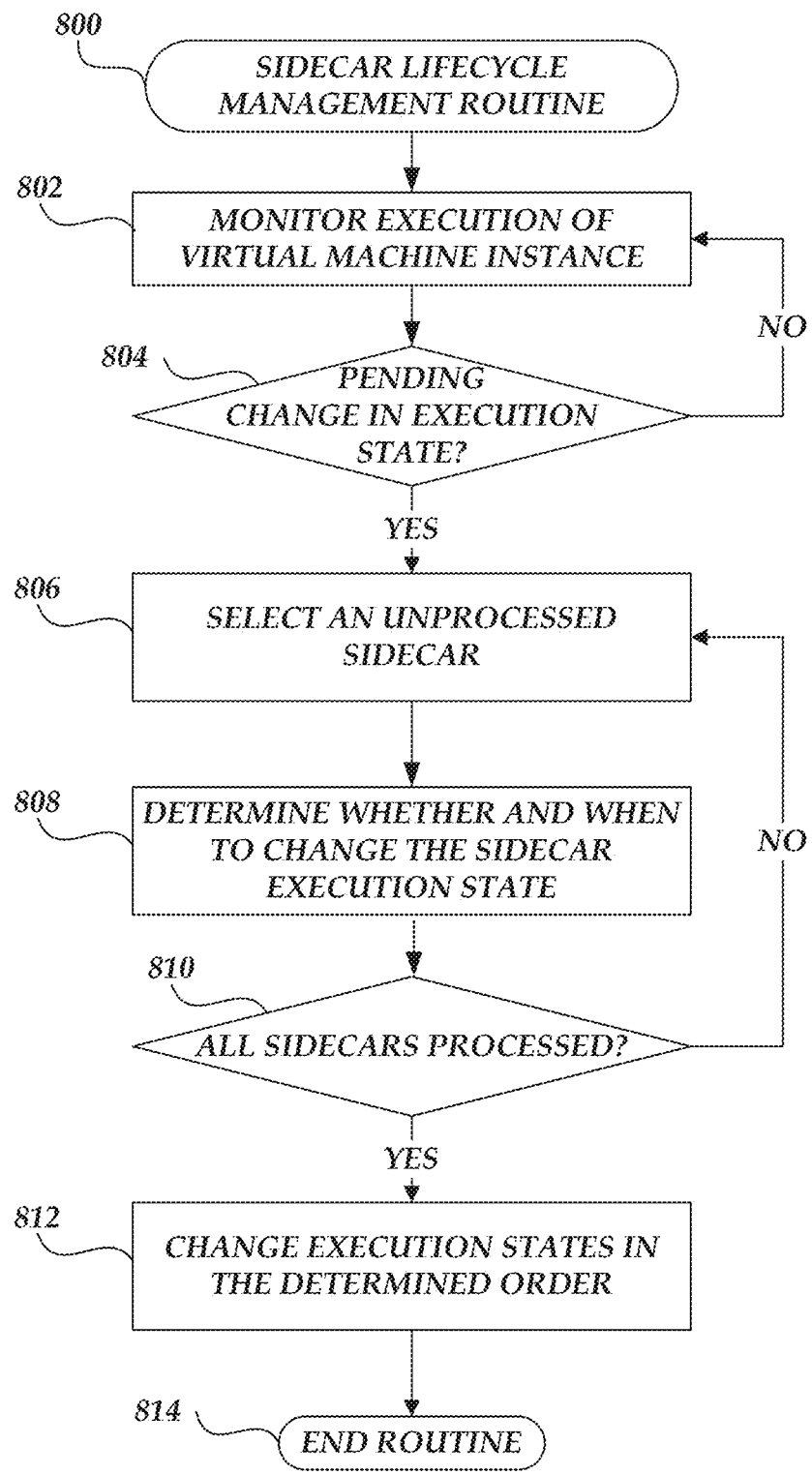
FIG. 8 is a flow chart depicting an illustrative routine for managing lifecycles of sidecars during execution of tasks on the on-demand code execution system of FIG. 1.

With reference to FIG. 8, an illustrative routine 800 for managing sidecar lifecycles will be described. The routine 800 may be carried out, for example, by the sidecar lifecycle management unit 142 of FIG. 1. The routine 800 begins at block 802, where the sidecar lifecycle management unit 142 (or, in some embodiments, the worker manager 140 or another component of the on-demand code execution system 110) monitors execution of a virtual machine instance. At decision block 804, a determination is made as to whether there is a pending change in the virtual machine instance's execution state. In some embodiments, as discussed above, the determination at decision block 804 may also include whether a change to the virtual machine instance's execution state has already occurred or is in progress. If no change in the virtual machine instance's execution state is detected, then the routine 800 branches to block 802 and continues monitoring.

If the determination at decision block 804 is that the virtual machine instance will change its execution state, then the routine 800 branches to block 806, where an unprocessed sidecar may be selected. At block 808, the sidecar lifecycle management unit 142 may determine whether the selected sidecar should change its execution state, and if so when it should change its execution state relative to the virtual machine instance. For example, the sidecar lifecycle management unit 142 may determine that the sidecar should change its execution state before, with, or after the virtual machine instance. In some embodiments, the sidecar lifecycle management unit 142 may determine a timing for the change to the selected sidecar's execution state relative to other sidecars. For example, the sidecar lifecycle management unit 142 may generate an ordered list of sidecar and virtual machine instance state changes, and may place the selected sidecar on the ordered list. In other embodiments, the sidecar lifecycle management unit 142 may determine that the selected sidecar does not require a change to its execution state, or that the selected sidecar will change to a different execution state than the virtual machine instance. For example, the sidecar lifecycle management unit 142 may determine that a sidecar should be deprovisioned after the virtual machine instance suspends execution of the task code, or that a new sidecar should be provisioned before the virtual machine instance resumes execution of the task code. In one embodiment, the sidecar lifecycle management unit 142 may ensure that a new sidecar virtual machine be created for each execution of task code within the virtual machine instance. Illustratively, where a sidecar virtual machine provides a security function, regeneration of a new sidecar for each execution of code may ensure that the function of the sidecar is not compromised, for example, by malicious data being passed to the sidecar virtual machine during a past code execution.

At decision block 810, the sidecar lifecycle management unit 142 may determine whether all of the sidecars have been processed by the routine 800. If not, the routine 800 branches to block 806, where one of the remaining unprocessed sidecars may be selected, and the routine 800 then iterates through blocks 806-810 until all sidecars have been processed. The routine 800 then branches to block 812, where the sidecar lifecycle management unit 142 causes the virtual machine instance and the sidecars to change execution states in the determined order. In some embodiments, the determined order may be relative to the virtual machine instance's change, and may not specify a particular order among the sidecars. For example, the sidecar lifecycle management unit 142 may determine that sidecars A and B should both change their execution states before the virtual machine instance does, but that it does not matter sidecar A's execution state change comes before or after sidecar B's. In other embodiments, the sidecar lifecycle management unit 142 may determine that one sidecar should change its execution state before another sidecar does so, and change the execution states accordingly.

The blocks of the routines described above may vary in embodiments of the present disclosure. For example, in some implementations of either routine, the sidecar configuration system 160 may be configured to implement additional functionality, such as generating and storing additional sidecars. Thus, the routines may include additional blocks, or the blocks of the routines may be rearranged, according to various embodiments.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
receiving a request to execute user-submitted code on a serverless code execution system;
obtaining configuration information associated with the user-submitted code, the configuration information specifying at least a main virtualized execution environment configured to execute the user-submitted code and a sidecar virtualized execution environment corresponding to sidecar functionality for the user-submitted code, the sidecar functionality implemented using a sidecar image;
configuring, using the sidecar image, the sidecar virtualized execution environment to implement sidecar functionality for the main virtualized execution environment;
causing the main virtualized execution environment to execute the user-submitted code;
causing the sidecar virtualized execution environment to implement the sidecar functionality in accordance with the configuration information;
determining that the main virtualized execution environment has completed execution of the user-submitted code; and
responsive to determining that the main virtualized execution environment has completed execution of the user-submitted code, deprovisioning the main virtualized execution environment and the sidecar virtualized execution environment.

2. The computer-implemented method of claim 1, wherein the sidecar virtualized execution environment is from a library of sidecar virtualized execution environments comprising a library of agents that implement the sidecar functionality.

3. The computer-implemented method of claim 1, wherein the sidecar virtualized execution environment comprises an agent that implements the sidecar functionality expected to be required during execution of the user-submitted code.

4. The computer-implemented method of claim 3 wherein the sidecar virtualized execution environment further comprises an operating system.

5. The computer-implemented method of claim 1, wherein configuring the sidecar virtualized execution environment to implement the sidecar functionality for the main virtualized execution environment comprises configuring the sidecar virtualized execution environment to communicate with the main virtualized execution environment.

6. The computer-implemented method of claim 1 further comprising provisioning the sidecar virtualized execution environment with an agent that implements the sidecar functionality.

7. A system comprising:
a data store storing configuration information; and
a computing device configured with executable instructions to perform operations including:
receiving a request to execute user-submitted code on a serverless code execution system;
obtaining, from the data store, configuration information associated with the user-submitted code, the configuration information specifying a sidecar configuration corresponding to sidecar functionality for the user-submitted code, the sidecar functionality implemented using a sidecar image;
configuring, using the sidecar image, a sidecar virtualized execution environment in accordance with the sidecar configuration to implement sidecar functionality for a main virtualized execution environment configured to execute the user-submitted code;
causing the main virtualized execution environment to execute the user-submitted code;
causing the sidecar virtualized execution environment to implement the sidecar functionality;
determining that the main virtualized execution environment has completed execution of the user-submitted code; and
responsive to determining that the main virtualized execution environment has completed execution of the user-submitted code, deprovisioning the main virtualized execution environment and the sidecar virtualized execution environment.

8. The system of claim 7, wherein the configuration information is determined based at least in part on a prior execution of the user-submitted code on the serverless code execution system.

9. The system of claim 7, wherein the request includes a debugging flag, header information, execution mode, application programming interface ("API") call, or other indicator associated with the sidecar functionality.

10. The system of claim 7, wherein the sidecar virtualized execution environment implements the sidecar functionality for a plurality of main virtualized execution environments.

11. The system of claim 10, wherein the computing device is configured with further executable instructions to perform further operations including determining that each of the plurality of main virtualized execution environments has been deprovisioned.

12. The system of claim 7, wherein configuring the sidecar virtualized execution environment in accordance with the sidecar configuration to implement the sidecar functionality for the main virtualized execution environment comprises one or more of redirecting input, redirecting output, monitoring execution, monitoring resource utilization, or collecting metrics.

13. The system of claim 7, wherein the sidecar configuration specifies the sidecar virtualized execution environment.

14. The system of claim 7, wherein the sidecar configuration is identified based at least in part on a user selection from a library of sidecar configurations.

15. The system of claim 7, wherein the main virtualized execution environment provides an application programming interface ("API") that enables access to profiling information.

16. One or more non-transitory computer-readable media including computer-executable instructions that, when executed on an on-demand code execution system, cause the on-demand code execution system to:
obtain configuration information associated with user-submitted code, the configuration information specifying a sidecar configuration corresponding to sidecar functionality for the user-submitted code, the sidecar functionality implemented using a sidecar image;

configure, using the sidecar image, a sidecar virtualized execution environment in accordance with the sidecar configuration to implement sidecar functionality for a main virtualized execution environment that executes the user-submitted code;

cause the sidecar virtualized execution environment to implement the sidecar functionality during execution of the user-submitted code, and responsive to a determination that the main virtualized execution environment has completed execution of the user-submitted code, configure the sidecar virtualized execution environment to cease implementing the sidecar functionality for the main virtualized execution environment.

17. The one or more non-transitory computer-readable media of claim 16 including further computer-executable instructions that, when executed by the on-demand code execution system, configure the on-demand code execution system to provision the sidecar virtualized execution environment.

18. The one or more non-transitory computer-readable media of claim 16 including further computer-executable instructions that, when executed by the on-demand code execution system, configure the on-demand code execution system to:

determine that the main virtualized execution environment has completed execution of the user-submitted code.

19. The one or more non-transitory computer-readable media of claim 16, wherein the sidecar virtualized execution environment is configured to read one or more of a filesystem or a memory location of the main virtualized execution environment.

20. The one or more non-transitory computer-readable media of claim 16, wherein the execution of the user-submitted code is triggered by a triggering event.

* * * * *